United States Patent [19]
Starke

[11] Patent Number: 5,950,367
[45] Date of Patent: Sep. 14, 1999

[54] SEALING DEVICE BETWEEN MOVABLE PARTS IN MUTUAL CONTACT

[75] Inventor: Wilfried Starke, Enningerloh, Germany

[73] Assignee: Mannesmann Aktiengesellschaft, Düsseldorf, Germany

[21] Appl. No.: 08/973,256

[22] PCT Filed: Jun. 6, 1996

[86] PCT No.: PCT/DE96/01043

§ 371 Date: Dec. 3, 1997

§ 102(e) Date: Dec. 3, 1997

[87] PCT Pub. No.: WO96/41980

PCT Pub. Date: Dec. 27, 1996

[30] Foreign Application Priority Data

Jun. 9, 1995 [DE] Germany ............................ 195 21 916

[51] Int. Cl.⁶ .................................................. E06B 7/22
[52] U.S. Cl. .......................................... 49/499.1; 49/493.1
[58] Field of Search ............................... 49/475.1, 493.1, 49/498.1, 499.1

[56] References Cited

U.S. PATENT DOCUMENTS

| 3,241,198 | 3/1966 | Baermann ........................ 49/499.1 X |
| 3,411,246 | 11/1968 | Miller ............................ 49/499.1 X |
| 4,447,989 | 5/1984 | Maplano et al. ................ 49/499.1 X |
| 4,660,805 | 4/1987 | Hahn et al. ...................... 251/328 |

FOREIGN PATENT DOCUMENTS

| 526748 | 7/1992 | European Pat. Off. . |
| 4322806 | 1/1995 | Germany ........................ 49/499.1 |

*Primary Examiner*—Jerry Redman
*Attorney, Agent, or Firm*—Cohen, Pontani, Lieberman & Pavane

[57] ABSTRACT

A device for sealing between two assembly parts that are movable relative to one another, especially between two damper blades or a damper blade and a stop of a flue gas armature. The device includes an elastic sealing element formed by a spring-steel strip, which contains two flat clamping edges arranged next to one another in a parallel fashion and pointing to the same side. The clamping edges are secured by a clamping device to one of the assembly parts. The spring-steel strip also has a sealing zone that is curved in an arc-shaped manner. The sealing element rests, with a resting surface located outside of the clamping edges, flat on the flat supporting surface of a supporting element. The supporting element is also securable by the clamping device to one of the assembly parts. The other assembly part comes into contact with the sealing element in the top area of the sealing zone curved in an arc-shaped manner and the relative movement between the two assembly parts occurs roughly tangentially relative to this top area. The supporting element is located inside of the space enclosed by the curved sealing element.

7 Claims, 4 Drawing Sheets

SEALING DEVICE BETWEEN MOVABLE PARTS IN MUTUAL CONTACT

BACKGROUND OF THE INVENTION

1. Field of the Invention

The invention relates to a device for sealing between two assembly parts that are movable relative to one another,

2. Description of the Prior Art

From DE 38 15 402 A1, a device for sealing the contact zone between a movable shut-off element of a pipeline and a stationary seat is known. That device uses an elastic seal in the form of an elongated spring-steel strip in the sealing area. Outside of the arched sealing zone, in the longitudinal direction of the sealing element, the spring-steel strip has two bends. The two longitudinal edge areas of the spring-steel strip point to the same side and are placed one atop the other, as clamping edges, and can be attached on one side to the movable shut-off element or to the stationary seal seat by means of a clamping device (e.g., a screw connection). This seal has proved to be very effective, particularly when the relative movement which occurs between the spring-steel strip and the matching seal seat during the closing process is roughly perpendicular to the arched sealing zone. In cases when the relative movement during closing is more tangential relative to the arched sealing zone, situations of extreme stress for the spring-steel seal sometimes develop, which can result in the spring-steel strip being lifted up from the supporting surface and, in consequence, in breakage of the spring-steel strip.

In order to avoid negative consequences of this type, it is known from WO 95/02136 to provide a supporting profile in the interior of the sealing element. This supporting profile, which serves as a hold-down device, rests on the supporting surface of the spring-steel strip near the bend farthest from the clamping point and prevents the strip from lifting up. The hold-down device can be designed, for example, as a roughly V-shaped profile, and it is secured between the clamping edges of the spring-steel strip by means of the clamping device. Because extraordinarily corrosive conditions frequently occur in flue gas fittings, the hold-down device, like the spring-steel strip, must be made of high-alloy material, making it quite expensive. It is also disadvantageous that when a large-area flue gas damper equipped with one of the known sealing elements is opened, the break-away torque resulting from the hold-down device can be undesirably high.

SUMMARY OF THE INVENTION

The object of the present invention is to provide a sealing device in which it is possible, upon reaching the closed position, to reliably avoid the impermissible lifting and deformation of the spring-steel strip by tangential side-forces, at the lowest possible material and assembly expense, without impermissibly detracting from the required elastic deformability of the sealing element; rather, the seal is to be more flexible, i.e., softer, in nature, in order to achieve a reduction in the break-away torque.

Pursuant to this object, and others which will become apparent hereafter, one aspect of the present invention resides in a device for sealing between two assembly parts movable relative to one another, especially between two damper blades or a damper blade and a stop of a flu gas armature. The device includes an elastic sealing element formed by a spring-steel strip containing two flat clamping edge regions arranged parallel and next to one another and configured to extend in a common direction, and a curved, arc-shaped sealing zone between the clamping edge regions so that the sealing element encloses a space. A support element is arranged inside the space enclosed by the sealing element and has a flat support surface. The sealing element is configured to have at least one bend between the sealing zone and at least one of the clamping edge regions so as to form a resting surface located outside of the clamping edge regions. The resting surface lies on the flat support surface of the support element. A clamping device is provided for clamping the clamping edge regions and the support element to one of the assembly parts so that the other assembly parts so that the other assembly part contacts the sealing element in a top area of the curved sealing zone, and so that relative movement between the two assembly parts occurs roughly tangentially relative to the top area.

BRIEF DESCRIPTION OF THE DRAWING

The invention is explained in greater detail in reference to the drawings. The drawings show.

DETAILED DESCRIPTION OF THE PREFERRED EMBODIMENTS

Figure 4:
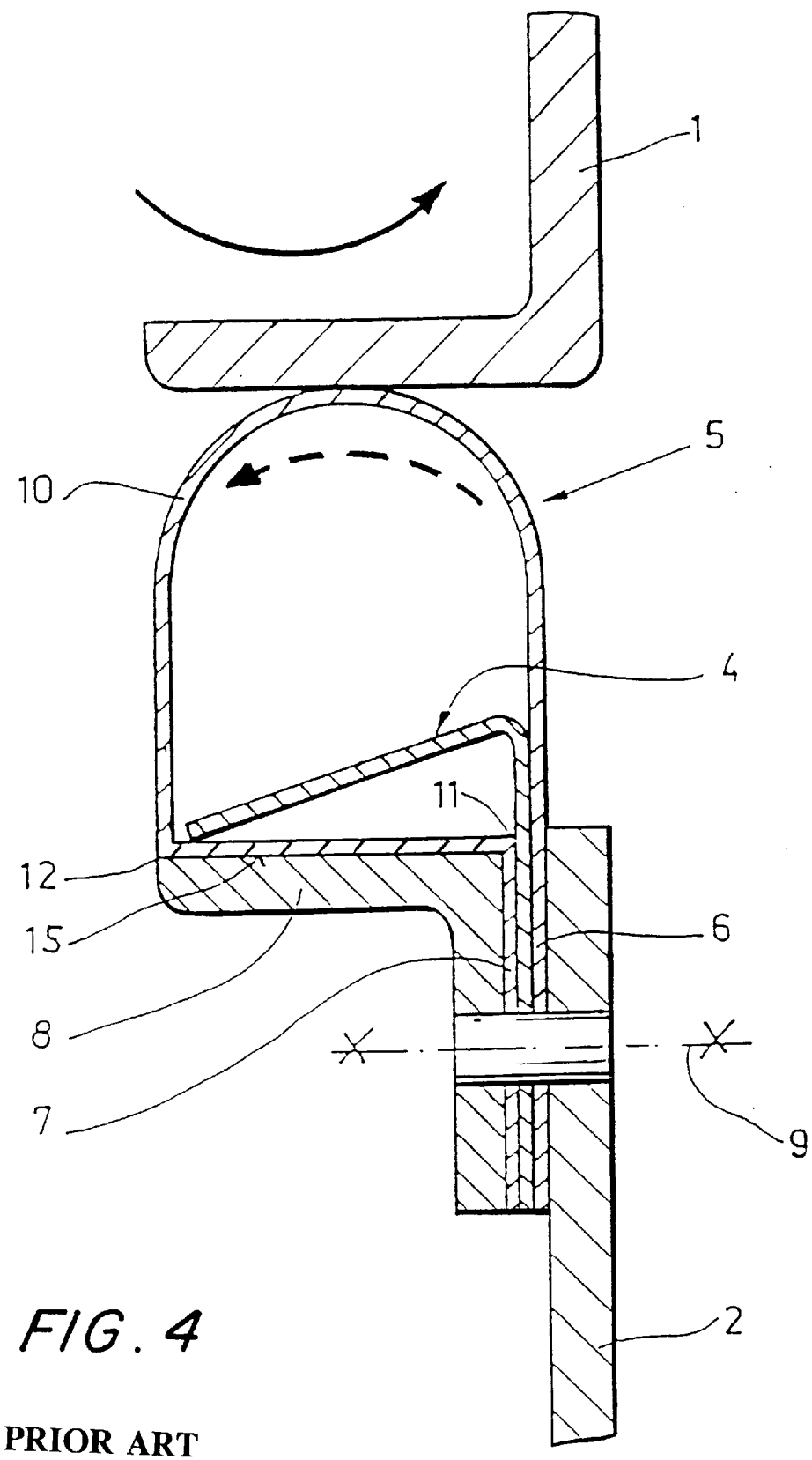
FIG. 4 is a cross-section through a known sealing arrangement.

A sealing arrangement according to the prior art as in WO 95/02136 is shown in FIG. 4. The two assembly parts that move relative to one another and must be sealed off from one another are identified by reference numbers 1 and 2. These assembly parts may be, for example, a shut-off damper 1, which is swung into its sealing position in a fashion roughly tangential relative to the stationary assembly part 2 with the spring-steel strip 5, as indicated by the solid upper curved arrow. Of course, the spring-steel strip 5 could also be attached to the movable assembly part in an alternate manner. This is indicated by the lower curved arrow in dashed lines. Naturally, it is also possible to equip both of the movable assembly parts with suitable spring-steel strips 5. Furthermore, it is often the case, as with multileaf dampers, that two immediately adjacent damper blades are brought into the closed position, i.e., that both assembly parts 1, 2 are moved at the same time. In such a case, in addition to the normal forces (sealing force), significant tangential side-forces also occur.

The spring-steel strip 5 has a sealing zone 10 that is curved in an arc-shaped fashion. The two longitudinal edges of this spring-steel strip 5 point to the same side and lie atop one another in parallel fashion as the clamping edges 6, 7. Between the clamping edge 7 and the sealing zone 10, two bends 11, 12 of 90° each are formed in the spring-steel strip 5, parallel to its longitudinal edges. As a result, a supporting surface is formed on the spring-steel strip 5. the supporting surface rests flat on a corresponding support surface 15 of a supporting element 8, which has an L-profile in cross-section, and supports the spring-steel strip 5 in the closed position against the sealing force. The vertical leg of this L-profile presses the two clamping edges 6, 7 against the assembly part 2 by means of a clamping device 9 (e.g., a screw connection) and thus fixes the spring-steel strip 5 in place on one side on the assembly part 2. In order to prevent the spring-steel strip 5 from lifting up from the supporting surface 15 in the area of the bend 12 when the assembly part 1 swings into the closed position, a V-shaped profile member 4 is provided as a hold-down device. The V-profile 4 presses on the supporting surface in the interior of the arched spring-steel strip 5 in the area of the bend 12. The V-profile 4 is fixed in place between the clamping edges 6, 7 by means of the clamping connection 9. FIG. 4 shows the spring-steel strip 5 in the non-deformed state.

Figure 1:
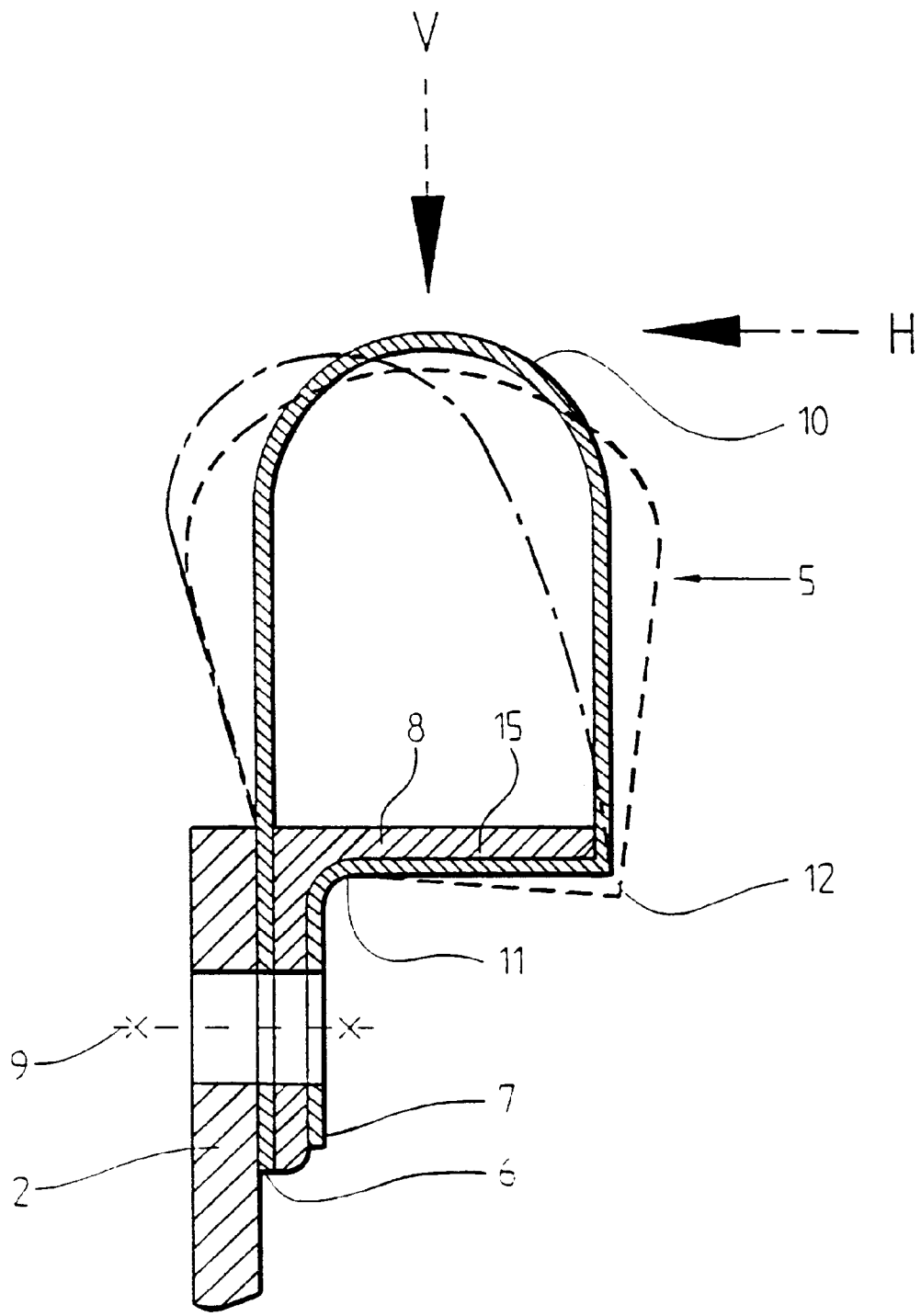
FIG. 1 is a cross-section through a sealing device according to the invention with an L-profile as a supporting element and indicated deformation lines.
Figure 2:
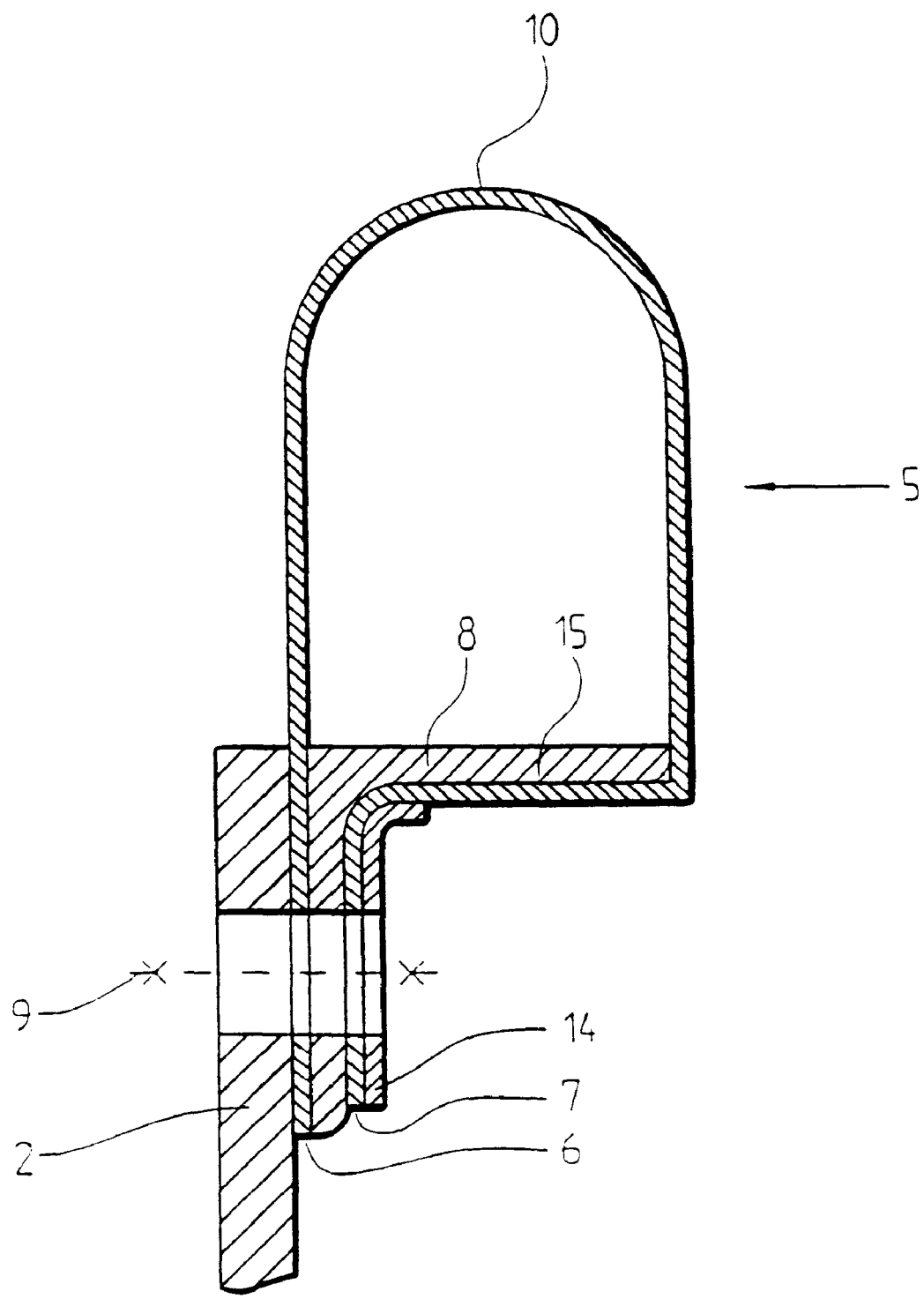
FIG. 2 is a cross-section through a sealing device as in FIG. 1 with an additional washer element.
Figure 3:
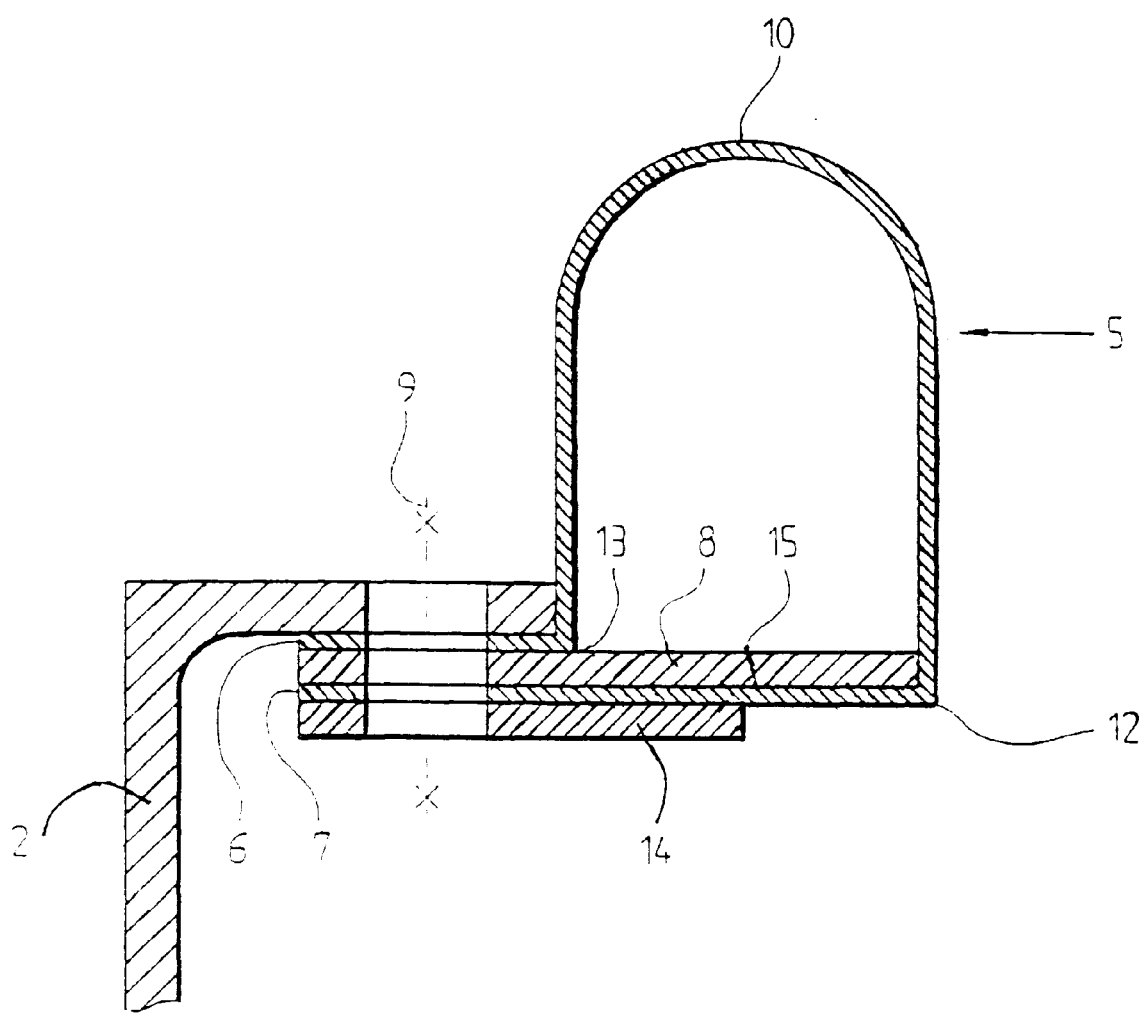
FIG. 3 is a cross-section through a device according to the invention with a holding strip as a supporting element.

In contrast to the generic prior art, in which the supporting element 8, seen in the direction of the sealing force, is located underneath the spring-steel strip sealing element 5, i.e., outside of the constructive area enclosed by the spring-steel strip sealing element 5, in the embodiment according to the invention this supporting element 8 is arranged inside the constructive area enclosed by the spring-steel strip sealing element 5. This is illustrated in FIGS. 1 to 3, which will be described in greater detail below. The same reference numbers as those used in FIG. 4 will be used for parts with the same functions.

The sealing device shown in cross-section in FIG. 1, which is clamped by means of the screw connection 9 onto the moving or non-moving assembly part 2 on one side, has an L-profile as the supporting element 8. The vertical leg of the L-profile is securely connected to the assembly part 2 by the screw connection 9. The sealing element formed by the spring-steel strip 5 lies with its arched sealing zone 10 over the other (horizontal) leg of the supporting element 8. While the spring-steel strip 5 is executed in a completely smooth manner between the sealing zone 10 and the left clamping edge 6, it has two bends 11, 12, preferably of 90° each, in its right-hand portion between the sealing zone 10 and the clamping edge 7. The distance between these two bends 11, 12 corresponds to the width of the supporting surface 15 on the lower side of the horizontal leg of the supporting element 8. In the non-stressed state, therefore, this portion (resting surface) of the spring-steel strip 5 located outside of the clamping edges 6, 7 rests completely flat on the supporting surface 15. FIG. 1 also shows, qualitatively, how the spring-steel strip 5 is deformed by a force component V (dashed line) acting vertically on the sealing zone 10 or by a force H (dot-dashed line) oriented tangentially to the sealing zone 10. These two force components V,H act when the sealing device is brought into its closed position. It can be seen that the spring-steel strip 5 cannot be lifted up by tangential side-forces H upon closing. If the tangential side-force H acts in the opposite direction, as happens when a shut-off damper is opened, the spring-steel strip 5 yields to the right, so that the required break-away torque is significantly reduced. After the shut-off damper 1 has been moved out of the sealing seat, the spring-steel strip 5 springs back into its initial position and rests on the supporting surface 15. Furthermore, the sealing device according to the invention possesses sufficient elasticity to absorb the vertically-acting sealing forces V. In order to increase rigidity against these sealing forces in special cases, it may be advantageous to securely hold the spring-steel strip 5 with its lower side on the supporting surface 15, over a partial area of the supporting surface 15, by means of at least one suitably shaped washer element 14 that can also be secured by the screw connection 9 as shown in FIG. 2. These washer elements 14 may be arranged continuously or separated from one another and can be designed, for example, as suitably curved washer discs.

FIG. 3 shows, in cross-section, a sealing device according to the invention that functions in principle in the same manner as that in FIG. 2. The only difference is that instead of an L-profile, a simple flat (planar) holding strip is used as the supporting element 8. Mentally, FIG. 3 is obtained from FIG. 2 by swinging the vertically-drawn profil leg of the supporting element 8 by 90° clockwise into the plane of the other leg. In this way, bend 11 is eliminated, and a bend 13 is created between the clamping edge 6 and the sealing zone 10. In terms of deformation, this embodiment behaves exactly like that in FIG. 2 or, when the washer element 14 is omitted, like that in FIG. 1.

In cases when the areas to be sealed off have a very large longitudinal extension, it is advisable for the sealing device according to the invention to be composed of partial pieces of a standard length (e.g., 1 m). The individual partial pieces are placed so as to abut one another at their end faces. In order to ensure that in each case both of the two abutting ends behave in the same manner, it is advisable to provide one end of a partial length, on its inner side or outer side, with a narrow affixed spring-steel strip, so that the corresponding end of the next partial piece can be slipped in or on in an exactly aligned manner, in the sense of a sleeve connection. It is advantageous to limit the length of this additional spring-steel strip in such a manner that it runs outside of the clamping points and bends, i.e., essentially only in the area of the sealing zone 10 and the two attached side areas. Alternatively, an additional spring-steel strip of this type could also be placed externally over the abutment area and secured accordingly.

I claim:

1. A device for sealing between two assembly parts movable relative to one another, comprising:

an elastic sealing element formed by a spring-steel strip containing two flat clamping edge regions arranged parallel and next to one another and configured to extend in a common direction, and a curved, arc-shaped sealing zone between the clamping edge regions so as to enclose a space;

a support element arranged inside the space enclosed by the sealing element and having a flat support surface, the sealing element being configured to have at least one bend between the sealing zone and at least one of the clamping edge regions so as to form a resting surface located outside of the clamping edge regions which lies on the flat support surface of the support element; and means for clamping the clamping edge regions and the support element to one of the assembly parts so that the other assembly part contacts the sealing element in a top area of the curved sealing zone and so that relative movement between the assembly parts occurs roughly tangentially relative to the top area.

2. A device as defined in claim 1, wherein the support surface is on a lower side of the support element, the sealing element being configured to have two bends outside of the sealing zone, the resting surface being on an inner side of the sealing element in an area between one of the bends and an associated clamping edge region and resting flat on the lower side of the support element.

3. A device as defined in claim 2, wherein the two bends are located on a common side of the sealing element between the sealing zone and the corresponding clamping edge region at a distance that corresponds to a width of the support surface of the support element.

4. A device as defined in claim 3, wherein the support element is configured to have an L-profile with a first leg having an inner side that forms the support surface and a second leg configured to clamp the two clamping edge regions onto the assembly part via the clamping means.

5. A device as defined in claim 2, wherein the support element is configured as a flat strip, the two bends, relative to the sealing zone, being located on opposite ends of the sealing element, the holding strip being configured to clamp the two clamping edge regions onto the assembly part via the clamping means, the support element being configured to reach to one of the bends.

6. A device as defined in claim 1, and further comprising a washer element arranged so as to hold the sealing element, over a portion of a width of the support surface of the supporting element, on a back side of the support surface of the support element.

7. A device as defined in claim 1, wherein the sealing element is formed of a plurality of partial pieces that abut flush against one another, and further comprising a plurality of slip-in sleeves arranged so that each respective area of abutment is covered by a respective one of the slip-in sleeves, the slip-in sleeves being made from a spring-steel strip.

* * * * *